United States Patent

Harvey et al.

[15] 3,672,267
[45] June 27, 1972

[54] SEQUENTIAL CONTROL FOR CAMERA DIAPHRAGM AND SHUTTER

[72] Inventors: Donald M. Harvey, Webster, N.Y.; Randall T. McConaughey, Boulder, Colo.

[73] Assignee: Eastman Kodak Company, Rochester, N.Y.

[22] Filed: Oct. 1, 1970

[21] Appl. No.: 77,079

[52] U.S. Cl. ..........................95/10 CE, 95/53 EA, 95/64 D
[51] Int. Cl. .........................................G03b 7/08, G03b 9/62
[58] Field of Search..................95/10 CE, 64 R, 64 D, 53 EA

[56] References Cited

UNITED STATES PATENTS

| | | | |
|---|---|---|---|
| 3,385,187 | 5/1968 | Bestenreiner | 95/10 C |
| 3,416,421 | 12/1968 | Biedermann et al. | 95/10 CE |
| 3,518,928 | 7/1970 | Bestenreiner | 95/64 X |
| 3,478,660 | 11/1969 | Land | 95/64 A |

Primary Examiner—Samuel S. Matthews
Assistant Examiner—Russell E. Adams, Jr.
Attorney—Robert W. Hampton and William F. Delaney, Jr.

[57] ABSTRACT

Exposure control apparatus comprises first and second blade members defining apertures and a photoelectric circuit that adjusts the blade members to form an exposure aperture of size according to the level of scene illumination. A photoelectric timing circuit integrates scene light with respect to time, and is actuated in response to adjustment of the blade members. The adjustment of the blade member and the initiation and termination of an exposure interval are controlled by a transducer that is actuated in response to a control signal from a trigger circuit. The transducer is adapted to adjust the blade members under the control of a voltage-dividing circuit, and to actuate the shutter to uncover the exposure aperture simultaneously with the setting of the blade members to form the exposure aperture. The trigger circuit is then connected with the light-integrating circuit that controls actuation of the transducer to actuate the blade members to close the exposure aperture after the exposure interval determined by that circuit.

8 Claims, 12 Drawing Figures

DONALD M. HARVEY
RANDALL T. McCONAUGHEY
INVENTORS

BY William F. Delany Jr.
Robert W. Hampton
ATTORNEYS

DONALD M. HARVEY
RANDALL T. McCONAUGHEY
INVENTORS

BY *William F. Delaney Jr.*

*Robert W. Hampton*

ATTORNEYS

DONALD M. HARVEY
RANDALL T. McCONAUGHEY
INVENTORS

BY William F. Delany Jr.

Robert W. Hampton
ATTORNEYS

DONALD M. HARVEY
RANDALL T. McCONAUGHEY
INVENTORS

BY William F. Delany Jr.
Robert W. Hampton
ATTORNEYS

SEQUENTIAL CONTROL FOR CAMERA DIAPHRAGM AND SHUTTER

BACKGROUND OF THE INVENTION

1. Field of the Invention

This invention relates to an automatic exposure control in a camera and more particularly to such a control that sequentially adjusts the diaphragm and then the shutter speed of a camera.

2. Description of the Prior Art

Many different types of automatic exposure control devices are known for automatically adjusting an exposure parameter in accordance with the level of scene illumination detected by a photocell in a control circuit. Such devices often include means for controlling both shutter speed and aperture size automatically as a function of scene brightness. An example of such prior art arrangements is shown in U.S. Pat. No. 3,205,797. While many of these previously proposed devices have operated in a generally satisfactory manner, they usually require complex apparatus, such as separate controls for each exposure parameter and means for synchronizing their operation.

SUMMARY OF THE INVENTION

It is an object of this invention to provide simplified and improved automatic exposure controls which are adapted to sequentially adjust the diaphragm setting and shutter speed of a camera.

Another object of this invention is to provide improved photoelectric exposure control circuits which preselect the diaphragm setting and then determine the exposure interval in accordance with the amount of scene light integrated with respect to time.

An exposure control according to the preferred embodiment of this invention comprises diaphragm control means including a photoelectric circuit that adjusts the diaphragm according to the level of scene illumination, and shutter control means including a photoelectric timing circuit that integrates scene light with respect to time, and means for initiating an exposure interval and simultaneously activating the timing circuit in response to adjustment of the diaphragm means. Preferably, the adjustment of the diaphragm and the initiation and termination of exposure interval all are controlled by a transducer that is actuated in response to a control signal from a trigger circuit, alternatively connectable with a photoelectric, voltage-dividing circuit for detecting light level and with a photoelectric, light-integrating circuit. The transducer is adapted to adjust the diaphragm under the control of the voltage-dividing circuit, and to actuate the shutter to uncover the exposure aperture simultaneously with the setting of the diaphragm. At the same time the trigger circuit is connected with the light-integrating circuit that controls actuation of the transducer to close the shutter after an exposure interval determined by that circuit.

According to the preferred embodiment of the invention, the exposure control includes a diaphragm member having a tapered aperture that moves from a position of widest aperture towards a closed position, and this member is retained in a suitable open position by the transducer determined by the light-level detecting circuit. The transducer is adapted to set the diaphragm and simultaneously release a shutter blade to move from a covering position over the exposure aperture to an uncovering position to initiate an exposure interval. Simultaneously a switching arrangement associated with the shutter blade connects the trigger circuit with a light integrating circuit which actuates the trigger circuit an appropriate period of time after activation of the timing circuit to cause the transducer to release the diaphragm member for continued movement towards its closed position thereby terminating the exposure interval.

This simplified mechanism provides for automatic adjustment of the diaphragm and subsequent control of the shutter speed by an electronic apparatus that includes a single transducer, a single trigger circuit and a single photocell.

The invention also contemplates the inclusion of a "low light" signal and a "shutter-open" signal in the control circuit. Further, the exposure control of this invention is adapted to compensate for film speed either by adjusting an electrical parameter in the light-level detecting circuit or by masking the photocell.

BRIEF DESCRIPTION OF THE DRAWINGS

The detailed operation of the preferred embodiment of this invention can be described more completely with reference to the accompanying drawings in which.

DETAILED DESCRIPTION OF THE INVENTION

An exposure control system according to the present invention includes an adjustable diaphragm mechanism including a member movable to any position along a path for varying an exposure aperture in accordance with the level of scene light, and a shutter mechanism controlled by an electronic time-delay circuit that establishes the length of an exposure interval. The time-delay circuit preferably is of the integrating type for continuously measuring the total accumulated amount of light energy impinging on a photoresponsive member in the timing circuit. When the diaphragm mechanism has been actuated to adjust the exposure aperture in accordance with the level of scene illumination, the shutter mechanism is actuated to initiate an exposure interval under the control of the electronic timing circuit that terminates the exposure interval in accordance with the exposure aperture adjustment and in accordance with the amount of illumination received during the exposure interval by the photoresponsive member in the timing circuit. The shutter timing circuit can compensate for the exposure aperture setting, for example, by adjustment of an electrical parameter of the timing circuit to vary its time constant, or preferably by varying the aperture of the photoresponsive member used in the timing circuit in accordance with the adjustment of the exposure aperture by the diaphragm mechanism.

Figure 1:
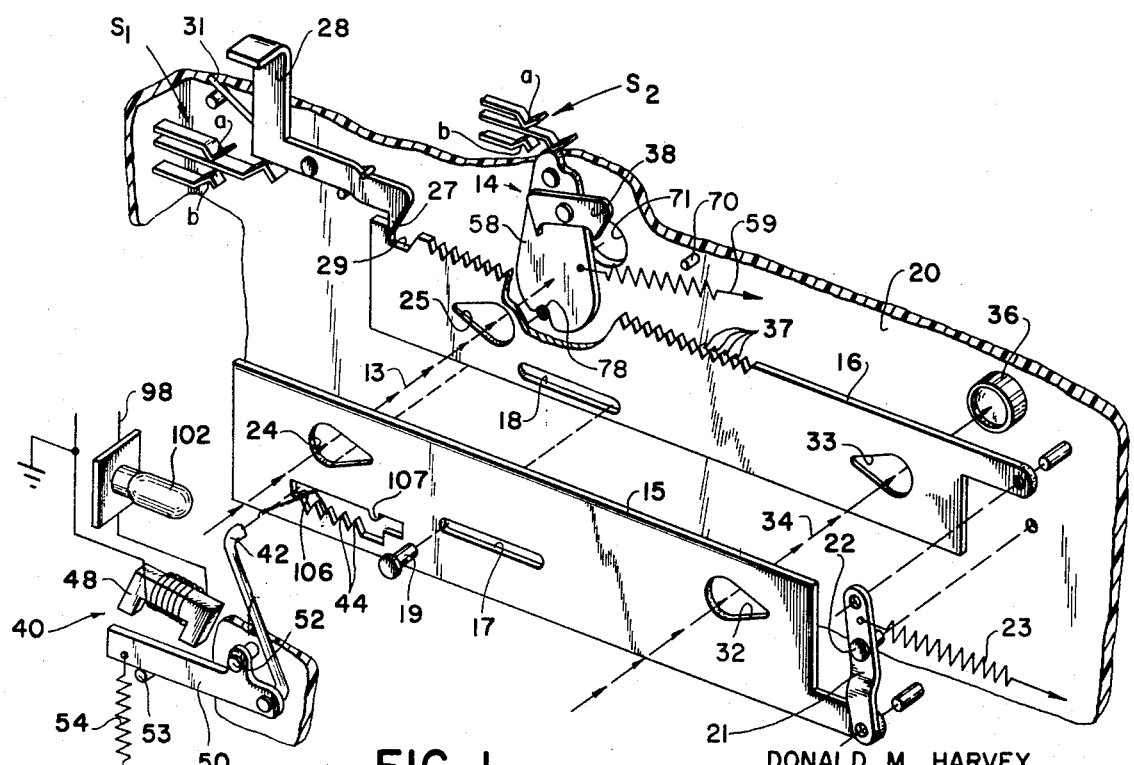
FIG. 1 shows a control circuit according to a preferred embodiment of the invention.

Referring now to the accompanying drawings, FIG. 1 shows an exposure control apparatus according to a preferred embodiment of the invention, including a two-bladed diaphragm mechanism 12 for establishing a variable exposure aperture in alignment with the optical axis 13 of an objective (not shown), and a shutter mechanism 14 for initiating an exposure interval.

The diaphragm mechanism 12 includes a pair of blades 15 and 16 each having a slot 17 and 18, respectively, for slidably mounting the blades on a pin 19 attached to a support plate 20. The blades are linked together by a bar 21 pivotally mounted on a pin 22, also attached to the support plate 20.

Figure 3:
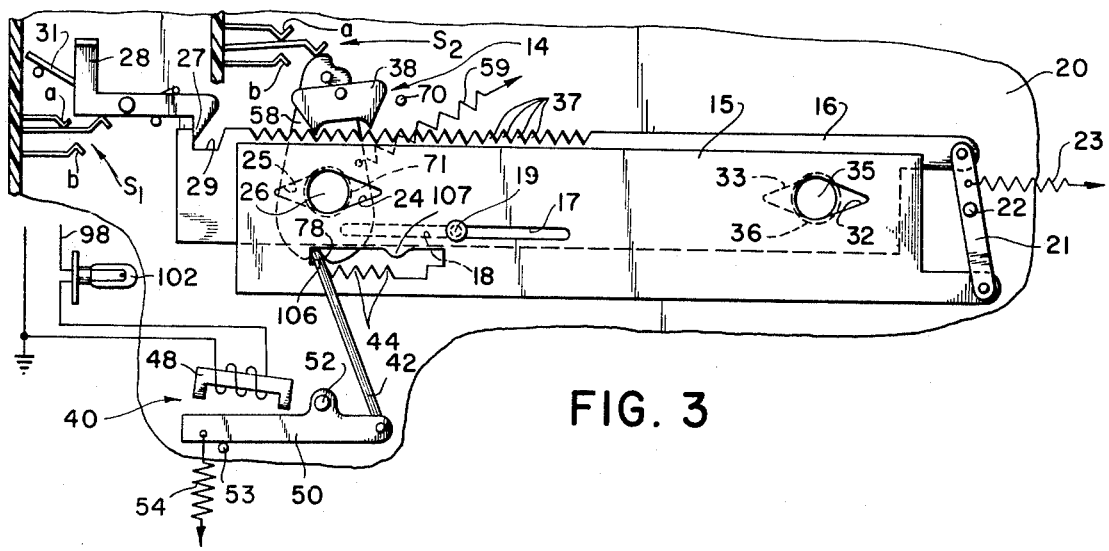
FIG. 3 is a front elevation view of the apparatus in FIG. 2 showing the apparatus in its cocked position.

The bar 21 is biased in a clockwise direction by a spring 23 to urge the blades toward equal and opposite horizontal movement relative to the lens axis 13. Each of these blades has a tapered aperture 24 and 25, respectively, overlying each other to define an exposure aperture 26 aligned with the optical axis 13. When the diaphragm mechanism 12 is in its "cocked" position, as shown in FIGS. 1 and 3, the blades 15 and 16 are retained in their widest aperture positions against the bias of the spring 23 by engagement of a projection 27 on a release lever 28 in a notch 29 of the blade 16. The release lever 28 is pivotally mounted on a pin 30 attached to the support plate 20, and it is biased into the retaining position shown by a spring 31. Associated with the release lever is a three pole switch S1 having a central spring arm contact normally engaged with a contact "a," but adapted to be moved into engagement with a contact "b" when the release lever is depressed. The apertures 24 and 25 are disposed with their tapered portions extending in opposite directions with respect to each other along the line of travel of the two diaphragm blades, such that relative movement of the blades 15 and 16 by the bias of the spring 23 will diminish the size of the exposure aperture 26 until the aperture is fully closed. Each of the blades also has a second tapered aperture 32 and 33, respectively, similar to the tapered apertures 24 and 25, overlying each other and an axis 34 to define a second variable aperture 35 overlying a photocell 36. Thus, opposite movement of the diaphragm blades 15 and 16 under the influence of the spring 23 will diminish the size of the aperture 35 over the photocell 36 simultaneously with the reduction of the size of the exposure aperture 26.

As the blades move after the lever 28 is depressed, serrations or notches 37 on the blade 16 are alternately engaged and released by a rocking pallet 38 to maintain the movement of the plates at a controlled even rate, until a transducer 40 is energized to engage a retaining pin 42 in one of the ratchet notches 44 defined by a slot 46 in the blade 15. The transducer includes an electromagnet 48 which is electrically connected in a control circuit shown in FIG. 2 described below. The electromagnet 48 is associated with an armature 50 that is pivotally mounted on a pin 52 and biased in a counter-clockwise direction against a detent 53 by a spring 54. The pin 42 is connected to the armature 50 for actuation to retain the diaphragm in an open position in response to energization of the transducer by the control circuit.

The shutter mechanism 14 includes a conventional paddle-type shutter blade 58 pivotally mounted on a pin 59 attached to the support plate 20 adjacent an aperture 71 aligned with the exposure aperture 26. The paddle 58 is biased by a spring 59 from a "closed" position, shown in FIG. 1, covering the exposure aperture to an "open" position against a stop 70.

In the "cocked" condition shown, the shutter paddle 58 is restrained in its "closed" position by engagement of the pin 42 in a notch 78 provided in the lower edge of the paddle 58. The pin 42 is held in engagement with the notch 78 by the bias of the spring 54, until the transducer 40 is energized to move it out of the notch and permit the paddle 58 to move to its "open" position under the bias of the spring 59 to initiate an exposure. A switch S2, associated with the shutter paddle, has a central spring arm contact normally engaged with a contact "a," but adapted to be moved into engagement with a contact "b" when the shutter opens. When the transducer 40 is subsequently deenergized to release the pin 42 from engagement with the ratchet 46, the diaphragm blades 15 and 16 continue their movement under the influence of the spring 23 until the exposure aperture 26 is closed, thereby terminating the exposure interval. Thus, the control circuit actuates the transducer to set the diaphragm and open the shutter, and then deactuates the transducer to close the shutter so that the aperture setting and shutter speed are both established by the control circuit.

Figure 2:
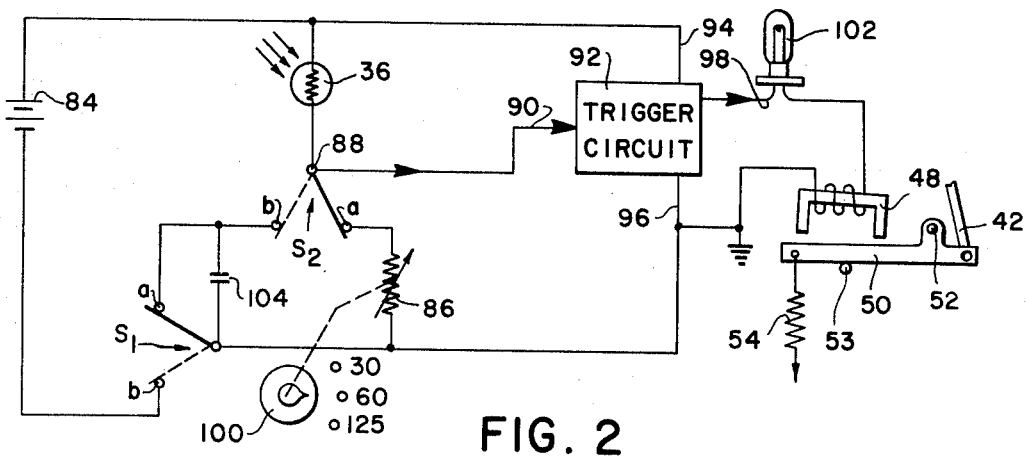
FIG. 2 is an exploded perspective view of the shutter and diaphragm apparatus of a camera according to a preferred embodiment of the invention.

As described above, when the shutter release lever 28 is depressed, the common contact of switch S1 is moved into engagement with the contact "b" to energize the control circuit shown in FIG. 2 from a battery source 84. With the common contact of the switch S2 in engagement with the contact "a," as shown, the photoconductive cell 36 is connected in series with a variable resistance 86 to form a voltage divider circuit that provides a voltage at a junction 88 that is functionally related to the level of illumination incident on the photoresistor 36. Connected to the junction 88 is the input terminal 90 of a trigger circuit 92 which conducts when its input voltage falls below a predetermined value, and blocks when its input rises above that value. This circuit is not shown in detail, since this type of circuit is well known in the art. One well known example of such a circuit is a Schmitt trigger. The trigger circuit 92 also includes a power lead 94, a ground lead 96 and an output lead 98. The trigger circuit in this embodiment is adapted to conduct current from lead 94 to lead 98 only when the potential at the input 90 is below a predetermined value. Thus, when the switch S2 is in its "a" position as shown, the trigger 92 will conduct if the scene illumination is below a predetermined level established by the variable resistor 86, the value of which may be adjusted by operation of a dial 100 which may be calibrated in exposure speed values. When the trigger 92 conducts, the output from the terminal 98 energizes a lamp 102 and the electromagnet 48. When the electromagnet 48 is energized, the shutter paddle 58 is released to open which actuates the common contact of the switch S2 to engage the "b" contact, which connects the photoresistor 36 in series with a capacitor 104 to operate as an integrating circuit with the capacitor being charged through the photocell at a rate determined by the resistance value of the photoresistor. The photocell 36 is disposed to receive light from a scene being photographed, so that its resistance value is functionally related to the level of scene brightness. Thus, when switch S1 connects the photocell with the capacitor, the voltage at 88 changes from its initial ground potential to a predetermined value in a period of time depending on the well-known time constant "RC" of the integrating circuit, which is determined by the value of the capacitor and the value of resistance 36 as established by the intensity of the light from the scene to be photographed. When the voltage at the input terminal 90 of trigger circuit 92 reaches the predetermined value, the trigger circuit is caused to trigger or switch from its conductive state to its nonconductive state thereby causing the electromagnet 48 to rapidly reduce its attracted force on the armature 50 so as to release the diaphragm blades 15 and 16 permitting them to move to their blocking position under the biasing force of the spring 23. Thus, the exposure interval is initiated simultaneously with the activation of the integrating circuit by the actuation of switch S2, and it is terminated by the trigger circuit 92 after a period of time determined by the integrating circuit according to the illumination incident on the photoresistance 36. Therefore, the time between the release of the blade 58 and the release of blades 15 and 16 dependent upon the value of the resistant 36 in the integrating circuit, which is determined by the level of scene illumination incident thereon. A bright scene condition produces a low resistance value of resistance 36 and has a small "RC" time constant for the circuit which results in a short exposure time. Similarly a low level of scene brightness produces a high resistance value and has a longer time constant for the circuit which results in a long exposure time under dim light conditions.

Figure 4:
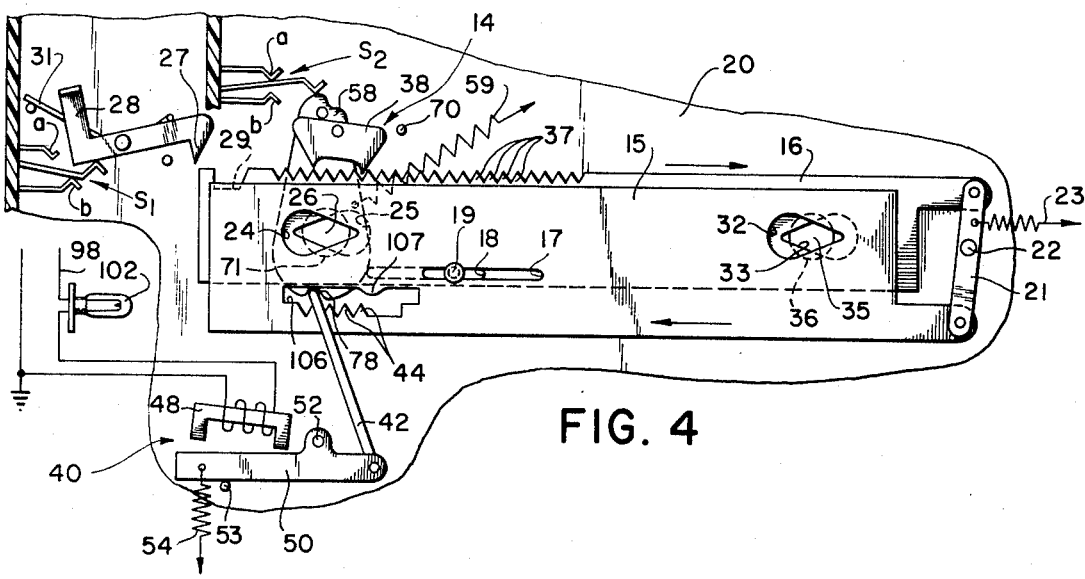
FIG. 4 is a view similar to FIG. 3 showing the apparatus during adjustment of the diaphragm.
Figure 5:
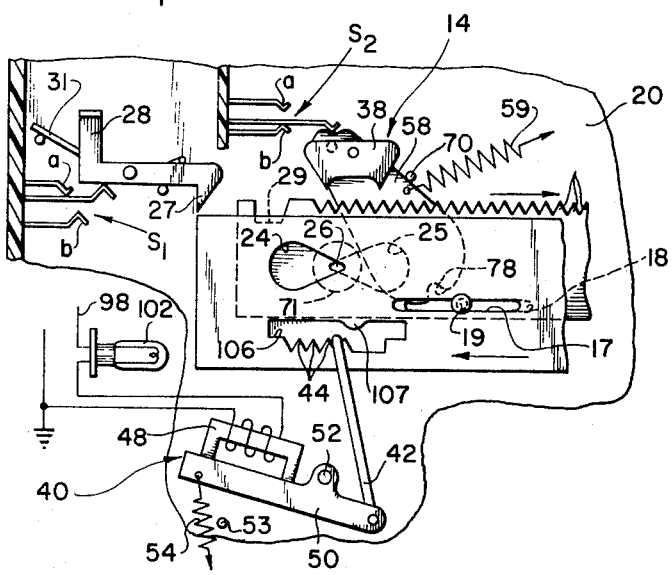
FIG. 5 is a view similar to FIG. 3, partially broken away, showing the apparatus after the diaphragm has been set and the shutter has been opened.
Figure 6:
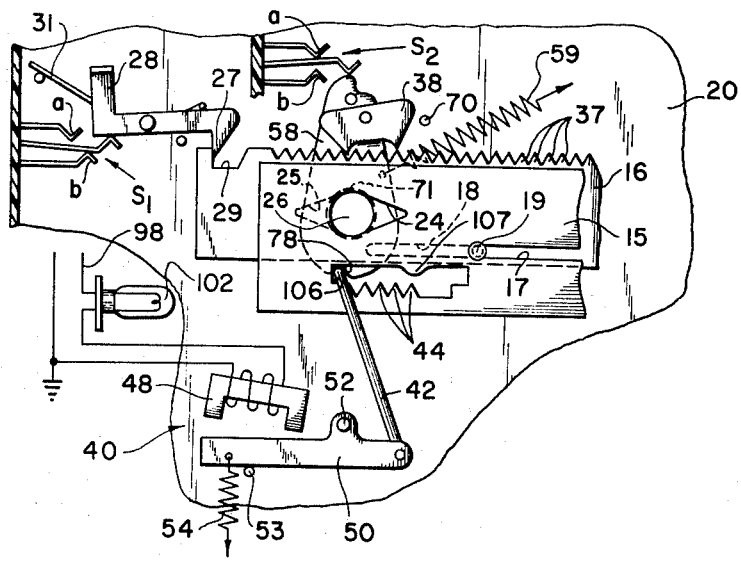
FIG. 6 is a view similar to FIG. 5 showing operation of the apparatus in "low light" conditions.

With reference to FIGS. 4–6, the shutter/diaphragm mechanism in FIGS. 1 and 3 operates in the following sequence under the control of the circuit in FIG. 2. When the release lever 28 is depressed, FIG. 4, switch S1 is moved from its position "a" to its position "b" during initial movement of the lever and before the latch 28 has fully disengaged from the notch 29, which energizes the circuit from the battery 84 and interrupts the shunting path across the capacitor 104.

The latch 28 then releases the diaphragm blades 15 and 16 for movement from their positions of maximum aperture to gradually attenuate the exposure aperture and the photocell aperture. This attenuation continues until the photocell resistance has increased to the point at which the voltage at junction 88 is reduced to a predetermined level at which the trigger 92 conducts. When the trigger circuit conducts, potential supplied over output lead 98 is effective to light the signal lamp 102 and to energize the electromagnet 48. The function of lamp 42 is to provide a "low light" warning in a manner described below, and to provide a "shutter-open" signal. When the electromagnet 48 is energized, the armature 50 is actuated to withdraw the retaining pin 42 from engagement with the notch 78 of the shutter 58 and to position the pin instead in one of the notches 44 provided in the ratchet 46, FIG. 5. Thus, the diaphragm is set simultaneously with release of the shutter 58 to initiate an exposure interval. At the same time the switch S2 is actuated to its "b" position by movement of the shutter to its "open" position. This changes the control circuit to a condition wherein light is integrated with respect to time, and the trigger will continue to conduct until integrated light reaches a predetermined total amount determined by the charge on the capacitor 28. That is, when capacitor 104 charges to a predetermined voltage level, the trigger circuit 92 will be switched to a nonconductive state and the electromagnet 40 will be de-energized to release the retaining pin 42 out of its engagement with the notches 44 of the ratchet 46. The blades 15 and 16, freed of restraint by the pin 42 as well as by pallet 38, will then move to their fully extended position to terminate the exposure.

The above-described sequence of operation assumed sufficient illumination so that the trigger does not conduct until there has been at least an appreciable amount of cell attenuation. This occurred well along in the sequence and not at the start thereof. However, when low light conditions are encountered (typically requiring more than 1/30 second exposure) the lamp 42 provides a warning of such condition. As seen in FIG. 6, when a low light condition prevails, the trigger circuit 92 immediately becomes conductive upon actuation of switch S1 to its "b" position. That is, the scene light is so weak that, even without any cell attenuation at all, the voltage at the input terminal 90 is below the predetermined level and the trigger circuit 92 becomes conductive immediately before the latch 28 releases the diaphragm plates 15 and 16. Thus, the trigger circuit 92 is effective to light the signal lamp 102 and to energize the electromagnet 48, but the armature 50 cannot move to pull down the pin 42 at this point, since the pin is engaged by a straight surface 106 of the ratchet 46 and is prevented from moving until the plate 15 has moved to the left. Under these conditions, there has not been a full release of the mechanism and the operator, alerted to the low light condition by the immediate lighting of the lamp 102, may if he desires restore the release lever 28 to its initial latching position. On the other hand, he may fully operate the lever 28 and release the mechanism for a long exposure time. The shutter 58 will open immediately after the start of movement of the aperture plates and will remain open for a sufficient exposure time. The pin 42 will seat in the first notch in the ratchet 46 to provide the maximum effective exposure aperture. The lamp 102 will remain lighted as long as the shutter is open to provide both a "low light" indication and an "open shutter" indication.

Figure 7:
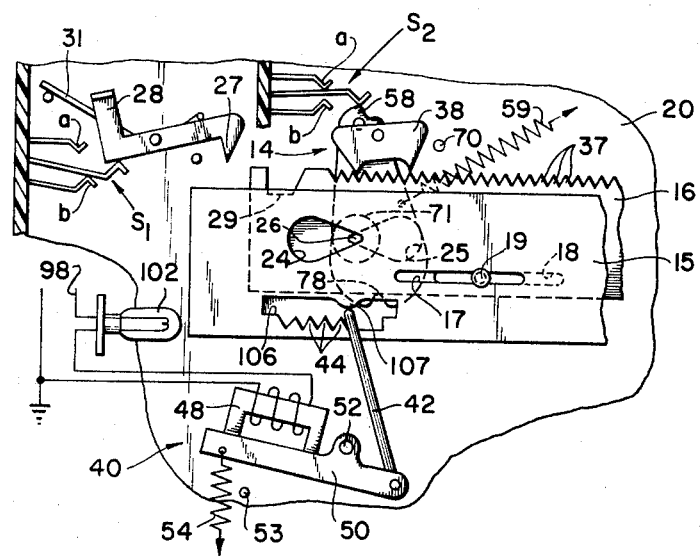
FIG. 7 is a view similar to FIG. 5 showing operation of the apparatus in high scene light conditions.

According to a further feature of the invention, provision is made to give an exposure even if there is an electrical failure, or if the camera is pointed toward a bright source of illumination which would tend to produce subject failure. In such cases, it is desirable that an exposure be made, even though it may be underexposed, so as to obtain at least some record. In accordance with this feature of the invention, a protrusion 107 is provided in the slot 46. If pin 42 has not been drawn downward by the armature 50 by the time that protrusion approaches the pin, the protrusion will depress the pin 42 to open the shutter 58, as seen in FIG. 7.

Figure 8:
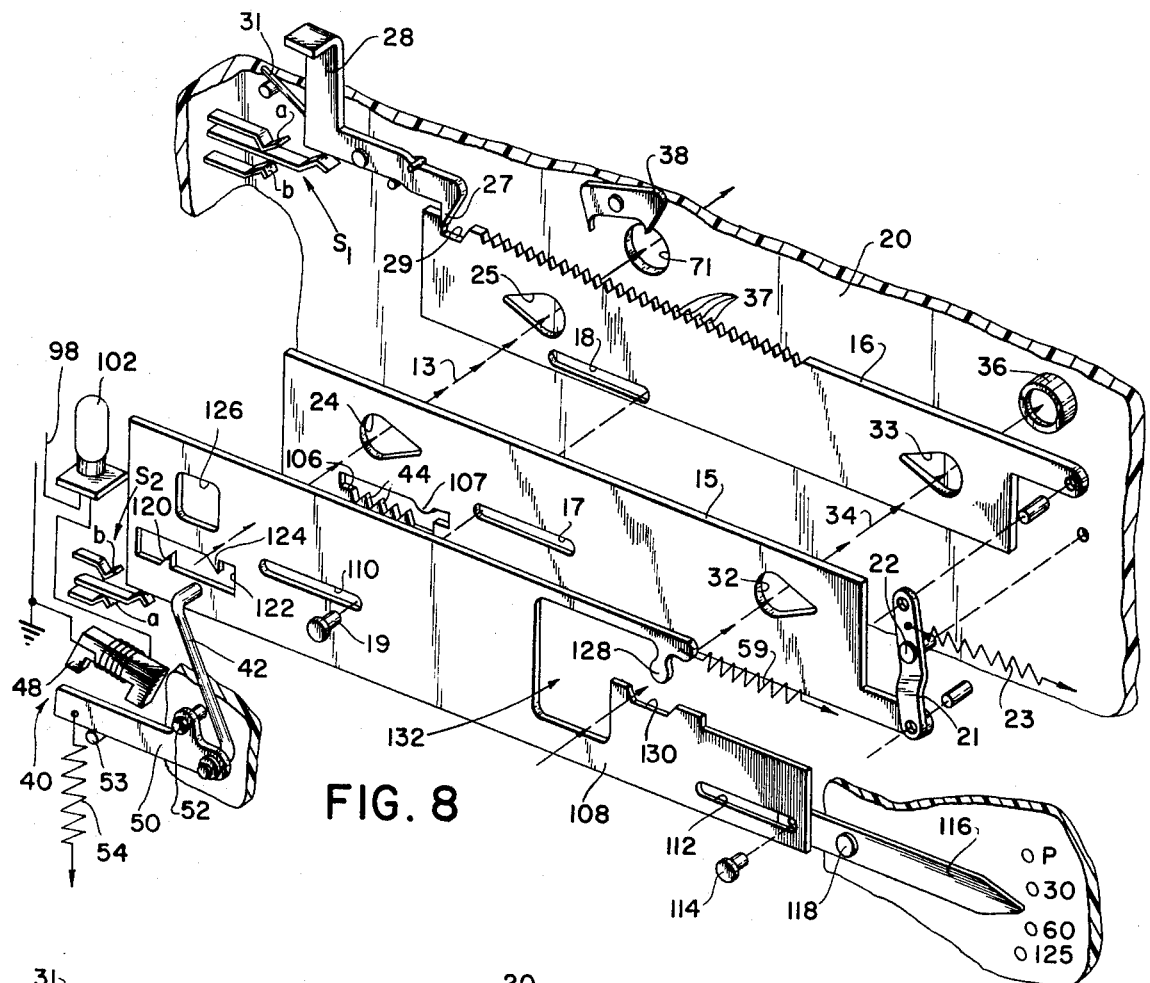
FIG. 8 is an exploded perspective view of an alternative embodiment of the invention which provides for manual or automatic adjustment of shutter speed.

Referring now to FIG. 8, a novel modification of the arrangement is shown, whereby a programmed shutter as well as a choice of shutter speeds are provided. The arrangement and operation of the aperture plates 15 and 16 is generally similar to that shown in FIG. 1, previously described. The components of this embodiment that are substantially identical to the FIG. 1-7 embodiment are identified by the same numerals and will not be redescribed.

It will be observed that the paddle shutter is replaced by a sliding blade 108 in this embodiment. The shutter blade 108 has slots 110 and 112 for slidably mounting the plate on pins 19 and 114, respectively. The pin 19 is attached to the support plate 20, but the pin 114 is attached to a control lever 116 pivotally mounted on the camera by a pin 118. Thus, the plate can slide lengthwise, as well as pivot about the pin 19 in response to adjustment of the position of the control lever 116. The shutter plate 108 is retained against the bias of the spring 59 in the "cocked" position shown in FIGS. 9 and 10 by contact between the retaining pin 42 and a detent 124 defined by a cut-out portion 122 of plate 108. When the electromagnet 48 is energized, the pin 42 is withdrawn from contact with the detent 124 which releases the shutter plate 108 for generally horizontal movement, and at the same time the aperture plates 15 and 16 are retained in an open position by engagement of the pin 42 in one of the notches 44 in the same manner as the previously described embodiment. The shutter plate 108 continues moving until a second detent 120 engages the pin 42, in which position an aperture 126 in the plate 108 is aligned with the exposure aperture 26 defined by diaphragm plates 15 and 16 to initiate an exposure interval. When the electromagnet is subsequently de-energized, the pin 42 is removed from engagement with the detent 120 to permit resumed movement of the shutter plate 108 to close the exposure aperture 26 and terminate the exposure.

Figure 9:
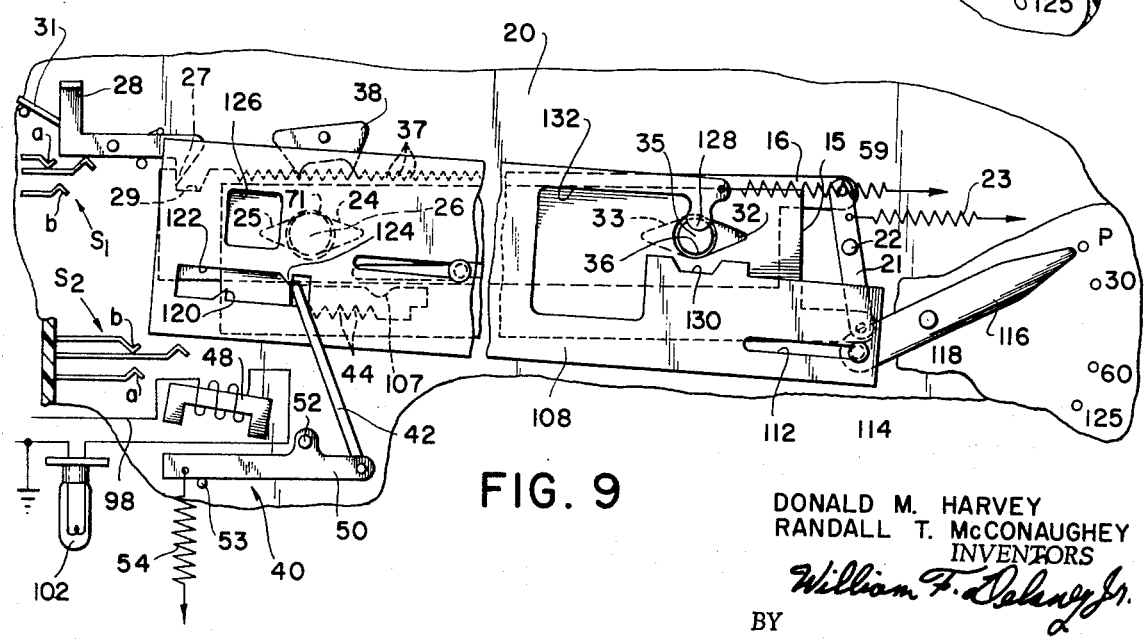
FIGS. 9 and 10 are front elevation views of the apparatus in FIG. 8.
Figure 10:
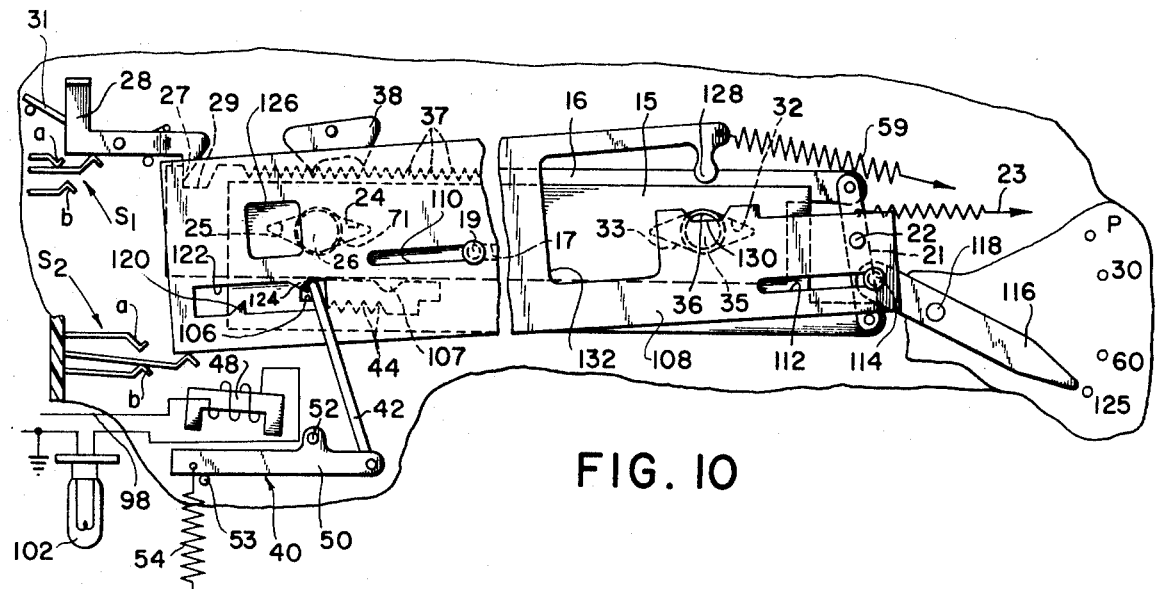

The right portion of the plate is so shaped, in accordance with this embodiment of the invention that, as the right end of the plate is tilted upward or downward by movement of the control member 116, the photocell 36 is variably masked by a projection 128 and a ridged portion 130 during adjustment of the diaphragm. Thus, as shown in FIG. 9, when the shutter plate 108 is tilted downward, the center of the cell 36 is masked as desired by the projection 128, which becomes increasingly significant as photocell aperture 35 is reduced. The mask 128 then causes the photocell to receive less light which produces a larger lens aperture which in turn produces a faster shutter speed. However, when the plate is tilted upward, as in FIG. 10, the cell is uniformly masked by the portion 130 during movement of plates 15 and 16. The shutter plate is provided with an aperture portion 132 so that the photocell is not masked when the shutter plate 108 moves to commence exposure. This arrangement provides a choice of shutter speeds or a programmed-shutter effect depending upon the shapes of the masking elements.

Figure 12:
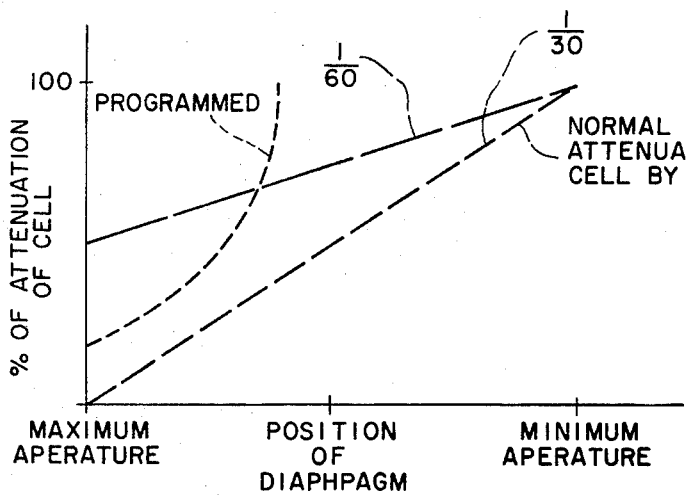
FIG. 12 is a graph showing the results of different degrees of cell masking by the shutter plate of FIGS. 8–10.

The effect of the masking on cell attenuation is indicated by the curves of FIG. 12. The 1/30 line represents the cell attenuation with no masking when the control lever 116 is set at "30" on its scale. The cell aperture is attenuated at a constant rate as the diaphragm blades move from their maximum aperture position to their minimum aperture position. When the control lever is set at "60" to partially mask the cell by element 130, the masking is constant during the adjustment of the diaphragm to provide a different constant rate of attenuation as indicated by the 1/60 line to increase cell attenuation. This results in a larger exposure aperture and faster shutter speed, and these differences are greater at lower light levels. When the central portion of the photocell is covered by the mask portion 128 by movement of the control lever to the position "p," the masking becomes progressively more effective as the attenuation by the diaphragm increases. The photocell aperture is decreased at a faster rate than the exposure aperture to provide a faster shutter speed in bright conditions than in low light conditions, and to establish a larger minimum aperture. The graph for the programmed condition is a curve rather than the straight line relationship of the nonprogrammed masking.

Figure 11:
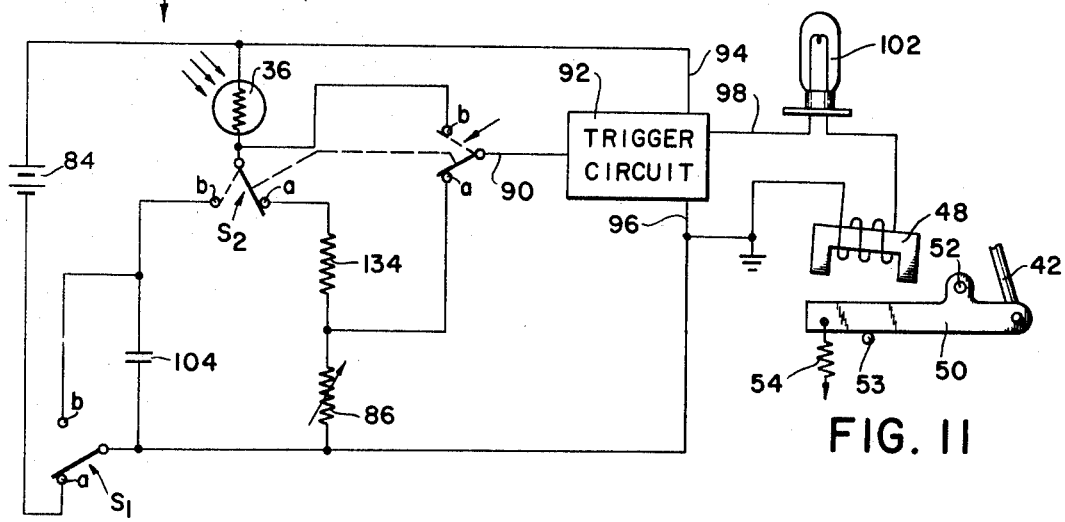
FIG. 11 shows a control circuit according to an alternative embodiment of the invention.

Such programming and shutter speed adjustment can be obtained through use of a modified control circuit as shown in FIG. 11. This circuit is generally similar to that of FIG. 2 described above, except for an additional resistor 134 connected in series between the photocell 36 and the variable resistor 86 during aperture adjustment, and a switch S3 mechanically coupled to switch S2 for simultaneous operation therewith.

When the switches S2 and S3 are in position "a," the resistor 134 is connected in series with the photoresistor 36, and the input 90 of the trigger circuit 92 is connected to the junction between the resistors 134 and 86. The resistor 134 is so selected that its resistance value is substantially less than that of photocell 36 at low light levels, but its resistance value becomes proportionally significant in relation to the resistance of the cell 36 at high levels of scene brightness. Consequently, the resistor 134 does not appreciably effect aperture adjustment in low light conditions, but it causes larger aperture selection under high scene light conditions. Accordingly, poorly illuminated scenes will be given 1/30 second exposure, but, as the scene light increases and the resistor 134 becomes effective, the exposure time will be shortened due to the selection of a larger aperture than would have been selected in the absence of that resistor.

The invention has been described in detail with particular reference to a preferred embodiment thereof, but it will be understood that variations and modifications can be effected within the spirit and scope of the invention.

I claim:

1. In a camera adapted to expose photographic film to scene light, an exposure control apparatus comprising:
   a. photoresponsive means adapted to receive illumination from an object scene for varying an electrical parameter in accordance with the level of scene illumination incident on said photoresponsive means;
   b. adjustable diaphragm means for establishing an exposure aperture for exposing the film, said diaphragm means including a member movable to a plurality of open positions for varying the exposure aperture and to a closed position in which scene light is prevented from exposing the film;
   c. diaphragm control means including a circuit coupled with said photoresponsive means, and activatable to adjust said diaphragm member to an open position corresponding to the magnitude of said electrical parameter to establish the exposure aperture at a size suitable for the level of illumination incident on said photoresponsive means;
   d. means for activating said diaphragm control means to adjust the exposure aperture;
   e. shutter means normally covering the exposure aperture and actuatable to uncover the exposure aperture;
   f. activatable time-delay circuit means including said photoresponsive means for producing a control signal a period of time after activation of said time-delay circuit means, said delay circuit means including means for establishing the time period as a function of the position of the diaphragm member and said electrical parameter of said photoresponsive means;
   g. means for actuating said shutter means to uncover the exposure aperture to initiate an exposure interval in response to the adjustment of said diaphragm member to a position suitable for the level of illumination incident on said photoresponsive means;
   h. means for activating said time-delay circuit in synchronization with the actuation of said shutter means to uncover said exposure aperture; and
   i. means for moving said diaphragm member to its closed position in response to said control signal to terminate the exposure interval, so that the exposure interval is determined by said time-delay circuit as a function of the level of scene illumination and the size of the exposure aperture.

2. In a camera adapted to expose photographic film to scene light, an exposure control apparatus comprising:
   a. photoresponsive means adapted to receive illumination from an object scene for varying an electrical parameter in accordance with the level of scene illumination incident on said photoresponsive means;
   b. diaphragm means for establishing an exposure aperture for exposing the film, said diaphragm means including a member movable to a plurality of open positions for varying the exposure aperture and to a closed position in which scene light is prevented from exposing the film;
   c. diaphragm control means including a circuit coupled with said photoresponsive means, and activatable to move said diaphragm member to an open position corresponding to the magnitude of said electrical parameter to adjust the exposure aperture to a size suitable for the level of illumination incident on said photoresponsive means;
   d. means for activating said diaphragm control means to adjust the exposure aperture;
   e. shutter means normally covering the exposure aperture and actuatable to uncover the exposure aperture;
   f. activatable time-delay circuit means including said photoresponsive means for producing a control signal a period of time after activation of said time-delay circuit means, said delay circuit means including means for establishing the time period as a function of the position of the diaphragm member and the level of scene illumination;
   g. means for actuating said shutter means to uncover said exposure aperture to initiate an exposure interval substantially simultaneously with the positioning of said diaphragm member to establish an exposure aperture at a size suitable for the level of illumination incident on said photoresponsive means;
   h. means for activating said time-delay circuit in synchronization with the actuation of said shutter means to uncover said exposure aperture; and
   i. means for moving said diaphragm member to its closed position in response to said control signal to terminate the exposure interval, so that the exposure interval is determined by said time-delay circuit as a function of the level of scene illumination and the size of the exposure aperture.

3. In a camera adapted to expose photographic film to scene light, and exposure control apparatus comprising:
   a. photoresponsive means adapted to receive illumination from an object scene for varying an electrical parameter in accordance with the level of scene illumination incident on said photoresponsive means;
   b. diaphragm means for establishing an exposure aperture for exposing the film, said diaphragm means including a member releasably retained in a first position and biased for movement along a path to vary the size of the exposure aperture when it is released from said first position;
   c. latch means actuatable for engaging and retaining said diaphragm member;
   d. electromagnetic transducer means associated with said latch means for controlling actuation thereof;
   e. diaphragm control means including a circuit coupled with said photoresponsive means and said electromechanical transducer for actuating said latch means to retain said diaphragm member in a position corresponding to the magnitude of said electrical parameter to establish the exposure aperture at a size suitable for the level of illumination incident on said photoresponsive means;
   f. means for activating said diaphragm control means circuit to establish the exposure aperture;
   g. actuatable shutter means normally covering the exposure aperture and actuatable to uncover the exposure aperture;
   h. activatable time-delay circuit means including said photoresponsive means for producing a control signal a period of time after activation of said time-delay circuit means, said delay circuit means including means for establishing the time period as a function of the position of the diaphragm member and the level of scene illumination;

i. means for actuating said shutter means to uncover the exposure aperture in response to energization of said output transducer to initiate an exposure interval when said diaphragm control member has been positioned to establish the exposure aperture at a size suitable for the level of illumination incident on said photoresponsive means;

j. means for activating said time-delay circuit in synchronization with the actuation of said shutter means to uncover said exposure aperture; and k. means for actuating said diaphragm to close said exposure aperture in response to said control signal to terminate the exposure interval, so that the exposure interval is determined by said time-delay circuit means as a function of the level of scene illumination and the size of the exposure aperture.

4. In a camera adapted to expose film to scene light, an exposure control apparatus comprising:

a. photoresponsive means adapted to receive illumination from an object scene for varying an electrical parameter as a function of the level of scene illumination incident thereon;

b. diaphragm means for establishing an exposure aperture for exposing the film, said diaphragm means including a member movable to any position along a path to vary the size of the exposure aperture;

c. eletromechanical transducer means actuatable to position said diaphragm to establish an exposure aperture;

d. a voltage-sensing trigger circuit coupled with said transducer and adapted to switch from a first state to a second state to actuate said transducer when an input voltage is below a first predetermined level;

e. first circuit means connectable with the input of said trigger circuit and with said photoresponsive means for producing a voltage at the trigger circuit input that varies as a function of the level of illumination incident on said photoresponsive means;

f. means for connecting said first circuit means with said trigger circuit to actuate said transducer when said diaphragm member is at a position in which said exposure aperture is suitable for the level of illumination incident on said photoresponsive means;

g. shutter means normally covering the exposure aperture and actuatable to uncover the exposure aperture;

h. means for actuating said shutter means to uncover said exposure aperture in response to positioning of said diaphragm member by said transducer;

i. activatable second circuit means connectable with the input of said trigger circuit and with said photoresponsive means for producing a voltage at the trigger circuit input that varies from a second predetermined level when activated to said first predetermined level over a period of time that is a function of the position of the diaphragm member and of the level of scene illumination, said second voltage level being below said first voltage level;

j. means for connecting said second circuit means with said trigger circuit for switching said circuit from said first state to said second state a period of time after activation of said trigger circuit, the period of time being established as a function of the position of the diaphragm member and the level of scene illumination;

k. means for activating said second circuit means in synchronization with the actuation of said shutter means to uncover said exposure aperture; and l. means for actuating said diaphragm to close the aperture in response to switching of said trigger circuit from its second state to its first state to terminate the exposure interval when the voltage from said second circuit means reaches said first predetermined level, so that the exposure interval is determined by said first trigger circuit as a function of the level of scene illumination and the size of the exposure aperture.

5. In a camera adapted to expose film to scene light, an exposure control apparatus comprising:

a. photoresponsive means adapted to receive illumination from an object scene for varying an electrical parameter as a function of the level of scene illumination incident thereon;

b. diaphragm means for establishing an exposure aperture for exposing the film, said diaphragm means including a member movable to any position along a path to vary the size of the exposure aperture;

c. electromechanical transducer means actuatable to position said diaphragm to establish an exposure aperture;

d. a voltage-sensing trigger circuit coupled with said transducer and adapted to switch from a first state to a second state to actuate said transducer when an input voltage is below a first predetermined level;

e. first circuit means connectable with the input of said trigger circuit and with said photoresponsive means for producing a voltage at the trigger circuit input that varies as a function of the level of illumination incident on said photoresponsive means;

f. means for adjusting the functional relationship between the voltage output of said first circuit means and the level of illumination incident on said photoresponsive means;

g. means for connecting said first circuit means with said trigger circuit to actuate said transducer when said diaphragm member is at a position in which said exposure aperture is suitable for the level of illumination incident on said photoresponsive means;

h. shutter means normally covering the exposure aperture and actuatable to uncover the exposure aperture;

i. means for actuating said shutter means to uncover said exposure aperture in response to adjustment of said diaphragm member by said transducer;

j. activatable second circuit means connectable with the input of said trigger circuit and with said photoresponsive means for producing a voltage at the trigger circuit input that varies from a second predetermined level when activated to said first predetermined level over a period of time that is a function of the position of the diaphragm member and of the level of scene illumination, said second voltage level being below said first voltage level;

k. means for connecting said second circuit means with said trigger circuit for switching said circuit from said first state to said second state a period of time after activation of said trigger circuit, the period of time being established as a function of the position of the diaphragm member and the level of scene illumination;

l. means for activating said second circuit means in synchronization with the actuation of said shutter means to uncover said exposure aperture; and m. means for actuating said diaphragm means to close the aperture in response to switching of said trigger circuit from its second state to its first state to terminate the exposure interval when the voltage from said second circuit means reaches said first predetermined level, so that the exposure interval is determined by said first trigger circuit as a function of the level of scene illumination and the size of the exposure aperture.

6. The exposure control apparatus claimed in claim 5, wherein said means for adjusting the functional relationship between the first circuit output voltage and the level of illumination on said photoresponsive means comprises means for selectively attenuating light incident on said photoresponsive means when it is connected with said first circuit means.

7. Exposure control apparatus for exposing a light sensitive medium to incident illumination comprising:

a. diaphragm means adjustable for defining an exposure aperture of varying size;

b. an opening shutter blade actuatable for exposing the light sensitive medium to the incident illumination through said exposure aperture;

c. actuatable circuit means for providing a first signal indicative of the intensity of the incident illumination and for providing a second signal a time interval after actuation thereof, said time interval being related to the intensity of the incident illumination; and d. means responsive to said first signal for opening said shutter blade and for adjusting said diaphragm means to a size related to the intensity of the incident illumination; and e. means responsive to said second signal for actuating said diaphragm means to close said exposure aperture to terminate the exposure after said time interval.

8. Exposure control apparatus for exposing a light sensitive medium to incident illumination, comprising:

a. photoresponsive means adapted to receive illumination for varying an electrical parameter in accordance with the intensity of the incident illumination;

b. diaphragm means for establishing an exposure aperture, said diaphragm means including a member movable along a path to vary the size of the exposure aperture;

c. a shutter blade normally covering the exposure aperture and actuatable to uncover the exposure aperture for exposing the medium to incident illumination;

d. an electronic circuit including said photoresponsive means for providing a first signal corresponding to the magnitude of said electrical parameter, said circuit including actuatable time-delay circuit means including said photoresponsive means for producing a second signal a time interval after activation thereof, said time interval being related to the intensity of the incident illumination; and e. means responsive to said first signal for adjusting said member to a position along said path relative to the magnitude of said electrical parameter and for opening said shutter blade; and f. means responsive to said second signal for actuating said member to close said exposure aperture.

* * * * *